Feb. 16, 1954  W. O. KAMMUELLER ET AL  2,669,368
ENDGATE FOR VEHICLES
Filed Dec. 19, 1949  2 Sheets-Sheet 1

Orrin A. Haeuser
William O. Kammueler
INVENTORS

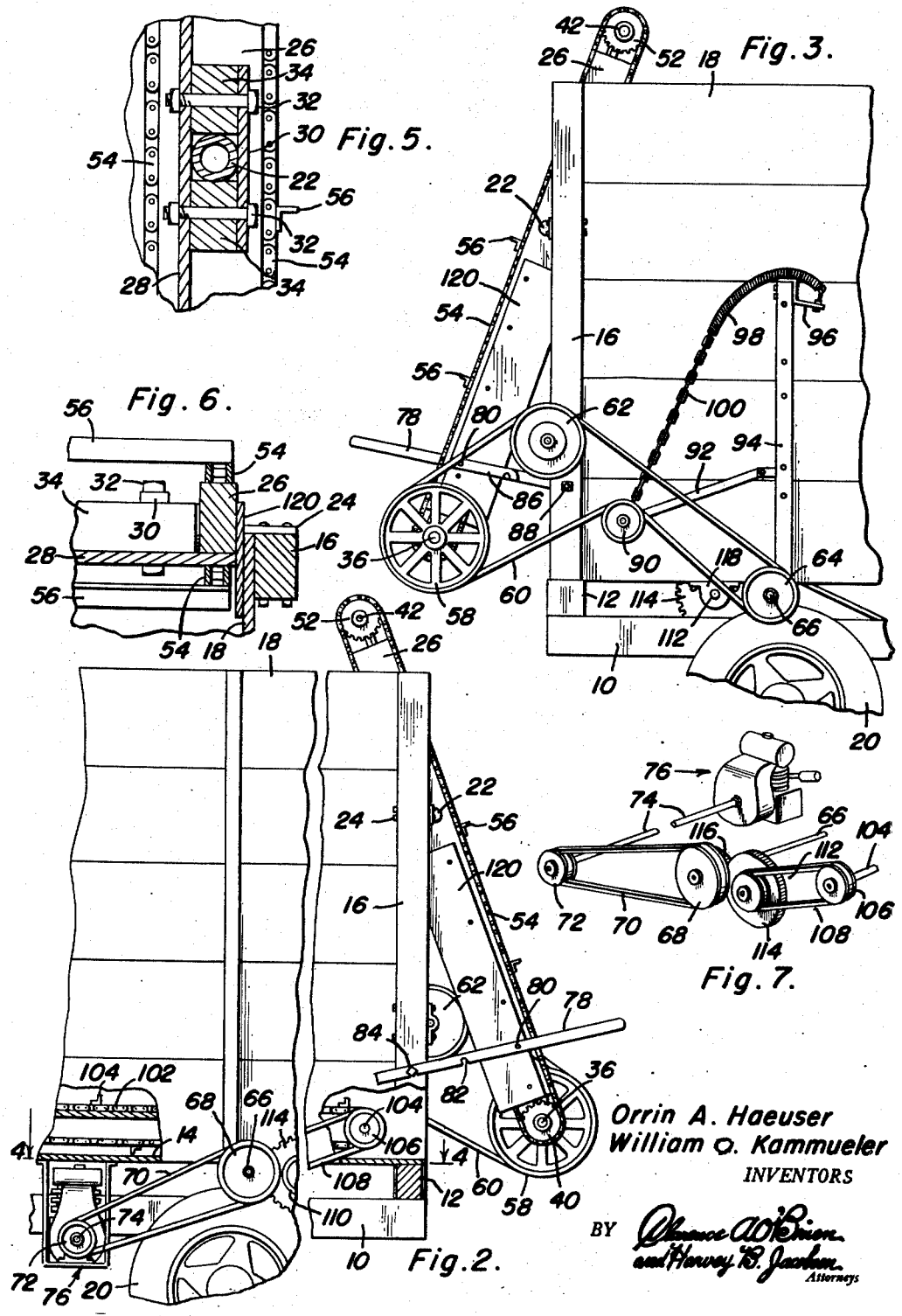

Patented Feb. 16, 1954

2,669,368

UNITED STATES PATENT OFFICE 2,669,368

ENDGATE FOR VEHICLES

William O. Kammueller and Orrin A. Haeuser, Fountain City, Wis.

Application December 19, 1949, Serial No. 133,768

4 Claims. (Cl. 214—522)

This invention relates to material handling apparatus and more particularly to an end gate for vehicles such as self-unloading trucks.

A primary object of this invention is to mechanize the last step of unloading such products as chopped hay, ensilage, straw or similar products. This end gate assures a uniform flow of material out of the vehicle and eliminates the use of hand labor to assure such uniform flow, this being especially important where the product is being unloaded into a conveyor or machine which would be clogged or obstructed if such flow is not uniform.

Another object of this invention is to provide means which will function as auxiliary control means for material being unloaded from a truck such as a self-unloading truck having a conveyor on the floor thereof.

More specifically, this invention has as a principal object the provision of an endless conveyor on the end gate of the vehicle, this endless conveyor acting in conjunction with the endless conveyor on the floor of the self-unloading truck to urge material downwardly and outwardly through the opening at the rear of the truck made by swinging the end gate into open position.

Still another object of this invention is to provide means whereby material can be unloaded at a more uniform speed, the material being prevented from clogging at the discharge opening.

Still another object of this invention is to provide an end gate assembly including a conveyor on the end gate which can be operatively coupled with power means ordinarily provided for the operation of the conveyor on the floor of self-unloading trucks.

And a last object to be mentioned specifically is to provide a device of this character which is relatively inexpensive and practicable to manufacture, which is safe, simple and easy to operate, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 2 is an elevational view of the rear end of the same truck, the view being taken from the left-hand side of the truck, and portions being broken away and the underlying portions being shown in vertical section and in elevation, to amplify the disclosure of this invention;

Figure 3 is a similar view taken from the right-hand side of the truck;

Figure 5 is a vertical sectional view, taken on the section line 5—5 in Figure 1;

Figure 6 is a horizontal sectional view, taken on the line 6—6 in Figure 1 and looking in the direction of the arrows; and Figure 7 is another diagrammatic, grouped, view indicating the arrangement of a portion of the drive mechanism.

Similar characters of reference designate similar or identical elements and portions throughout the specification and throughout the different views in the drawings.

Figure 1:
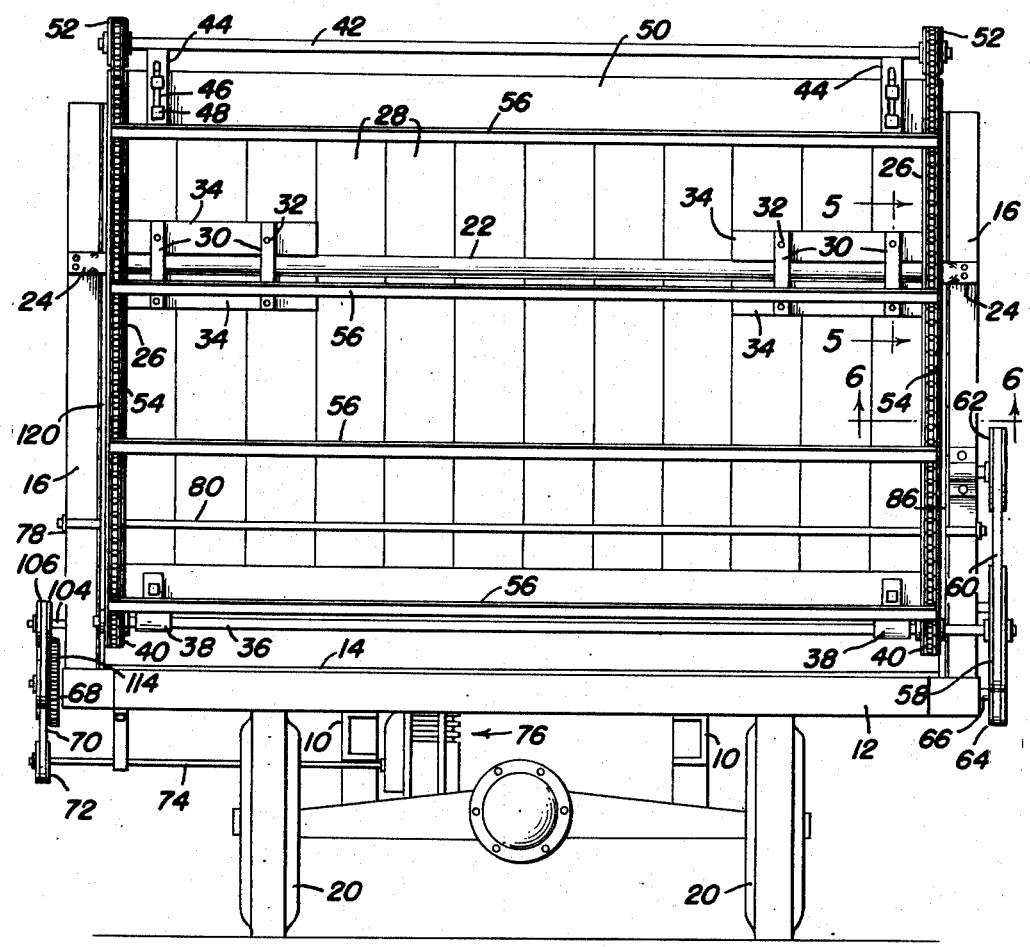
Figure 1 is a rear end view of a self-unloading truck with this invention incorporated thereon.
Figure 4:
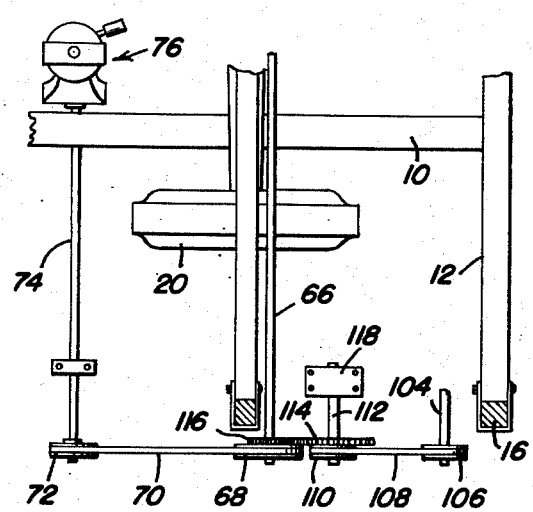
Figure 4 is a diagrammatic view proposed as illustrating the general relationship of the drive means for both the conveyor on the floor of the truck and the conveyor on the end gate, the view being limited to an illustration of that portion of the drive means located on the left-hand side of the truck.

Referring now to the drawings in detail, the environment wherewith this invention is adapted to be used includes a truck vehicle or the like and is exemplified by the self-unloading truck fragmentarily illustrated in the drawings.

This truck includes longitudinal frame members 10, transverse frame members 12, a floor 14, end gate posts 16 at the rear end of the truck body, side walls 18 for the truck body, and ground contacting wheels 20.

The end gate is supported upon a transversely disposed bar 22 which may be flattened terminally and secured as indicated at 24 on the end gate posts 16. It should be noted that this bar 22 is preferably mounted at a height above the center of the end gate. The end gate will include side members 26 and plate members 28, and straps 30 may be secured by bolts 32 to plate members 28 adjacent the sides of the end gate to provide further support for the end gate, spacer blocks 34 being placed between the straps 30 and the plates 28 to engage intermediate portions of the bar 22, it being understood that this bar 22 is inserted through horizontally disposed bores in the side members 26 of the end gate.

A horizontal shaft 36 is rotatably mounted in bearings 38 on the lower end portion of the end gate, and sprocket wheels 40 are fixed to this shaft 36 at the sides of the gate. Another shaft 42 is carried by inflexible strap members 44 on the upper end of the gate, these strap members having longitudinally disposed slots 46 to receive bolts with nuts 48 whereby the strap members are adjustably secured on an upper portion 50 of the end gate. The shaft 42 has sprocket wheels 52 on the ends thereof and endless chains 54 are entrained on the corresponding pairs of sprockets 40 and 52. Cross bars 56, represented as constructed of angle iron, are terminally secured to corresponding portions of the endless chains 54, and it will be clear that the conveyor thus constituted revolves about the major portion of the end gate. Adjustability of the strap members 44 allows for the tightening of the endless chains 54, when necessary.

A pulley 58 is connected by a belt 60 with an idler pulley 62 mounted upon the right-hand side of the truck body, preferably upon one of the end gate posts 16, and this belt is entrained over another pulley 64 which is driven by a shaft 66 extending transversely of the truck body. The shaft 66 is driven by a pulley 68 on the opposite side of the truck body, and the pulley 68 is driven by a belt 70 and the drive pulley 72 secured to the drive shaft 74 of a motor generally indicated at 76. The motor 76 will ordinarily be mounted upon the floor 14 by any suitable bracket means, and it is preferred that the motor be supported in front of the rear ground contacting wheels 20.

A manually operated lever 78 is pivoted on a rod 80 which extends across the end gate, as best illustrated in Figure 1. The lever 78 has a pair of spaced notches 82 adapted for selectively engaging a bolt 84 or the like fixed on one of the end gate posts 16, whereby the end gate may be supported in open position, as illustrated in Figure 2. A latch 86, similar in function and angular disposition to the lever 78, but shorter than the said lever, is fixed to the opposite end of the rod 80, and this latch 86 has a notch therein to engage a similar bolt 88 or the like on the opposite gate post, as will be clearly understood from an inspection of Figures 1 and 3. The latch 86 and the second notch in the lever 78 will find utility when the gate is to be locked in closed position.

A belt tightener pulley 90 is rotatably mounted on an arm 92 which is pivoted on a bracket 94 on the right-hand side of the truck body. This bracket 94 also supports another bracket 96 to which is secured one end of a resilient elongated member 98. The member 98 is connected by a chain 100, or the like, to the outer end of the arm 92, whereby the belt tightener pulley 90 is biased into a position to maintain proper operative tightness in the belt 60, when the end gate is moved from closed position to open position, or to intermediate positions when provision is made therefor.

A conveyor will ordinarily be provided in the bottom of the truck body, to carry material toward the rear of the truck and along the floor 14. While the exact details of this conveyor are not material in this application, the conveyor illustrated includes one or more endless chains 102 and cross bars 104 entrained over suitable guiding and driving rotary members, one of which is indicated as being driven by a shaft 104 and a pulley 106 on this shaft. A belt 108 connects the pulley 106 with another pulley 110 mounted upon the shaft 112 and driven by a gear wheel 114 which is enmeshed with another gear wheel 116 fixed on the shaft 66. Suitable bearing supports will be provided for the shafts, as indicated by the bearing structure 118 for the shaft 112. Flexible guard plates 120 will be secured to each side of the end gate and these guard plates will fit within the rear end of the truck body when the gate is in closed position, and when the gate is open and operating these guard plates prevent discharge from the sides of the gate and in some cases in preventing jamming of the material in the discharge opening.

The operation of this invention will be clearly understood from a consideration of the foregoing description and the mechanical details thereof, taken in connection with the above recited objects and the drawings.

In recapitulation, it need only be added that it is proposed to operate the conveyor on the floor of the vehicle at the same time as the conveyor on the end gate is operated.

Minor variations from the embodiment disclosed may be resorted to within the scope of the appended claims.

Having described the invention, what is claimed as new is:

1. An end gate assembly for a self-unloading truck vehicle having a bed and an end gate supporting structure, comprising an end gate mounted on the gate supporting structure to pivot about a horizontal axis between the upper and lower ends of the gate, vertically spaced horizontal shafts rotatively mounted on said end gate on opposite sides of said pivotal gate mounting, driving and guiding members mounted on said shafts, an endless conveyor entrained over said driving and guiding means, driving means for said conveyor and resilient, adjustable slack take-up means connected to said driving means for maintaining a continuous driving connection to the endless conveyor as the end gate is swung about the pivot, to an open position, said slack take-up means elastically limiting the end gate opening in response to changes in weight pressing against the end gate.

2. An end gate assembly for a self-unloading truck vehicle having a bed and an end gate supporting structure, comprising an end gate mounted on the gate supporting structure to pivot about a horizontal axis between the upper and lower ends of the gate, vertically spaced horizontal shafts rotatively mounted on said end gate on opposite sides of said pivotal gate mounting, driving and guiding members mounted on said shafts, an endless conveyor entrained over said driving and guiding means, driving means for said conveyor and slack take-up means connected to said driving means for maintaining a continuous driving connection to the endless conveyor as the end gate is swung about the pivot to open position, said driving means including a motor, a pulley on one of said shafts, and a belt drivingly interconnecting said motor and said pulley, said slack take-up means including an auxiliary pulley contacting said belt, a bracket adapted to be mounted on the truck body, and resilient means on said bracket urging said last mentioned pulley toward said belt, said slack take-up means elastically limiting the end gate opening in response to changes in weight pressing against the end gate.

3. An end gate assembly for a self-unloading truck vehicle having a bed and an end gate supporting structure, comprising an end gate mounted on the gate supporting structure to pivot about a horizontal axis between the upper and lower ends of the gate, vertically spaced horizontal shafts rotatively mounted on said end gate on opposite sides of said pivotal gate mounting, driving and guiding members mounted on said shafts, an endless conveyor entrained over said driving and guiding means, driving means for said conveyor and slack take-up means connected to said driving means for maintaining a continuous driving connection to the endless conveyor as the end gate is swung about the pivot, the upper of said shafts being vertically adjustable to vary the tension on the runs of the endless conveyor.

4. An end gate assembly for a self-unloading truck vehicle having a bed and an end gate supporting structure, comprising an end gate mounted on the gate supporting structure for pivotal movement about a horizontal axis intermediate the upper and lower ends of the end gate, vertically spaced, horizontal shafts rotatively mounted on the upper and lower ends of said end gate, conveyor driving and guiding members on said shafts and an endless conveyor entrained over said members, one of said shafts constituting a drive shaft for said conveyor, driving means for said conveyor on said vehicle, pulley means on said one of said shafts and said driving means, a belt interconnecting said pulley means, and a slack take-up for the belt whereby a driving connection between the conveyor and the driving means will be maintained while the end gate is pivoted to a selective position, means on said end gate mounting one of said shafts for vertical adjustment to vary the tension on the runs of the endless conveyor.

WILLIAM O. KAMMUELLER.
ORRIN A. HAEUSER.

References Cited in the file of this patent
UNITED STATES PATENTS

| Number | Name | Date |
|---|---|---|
| 402,111 | Stark | Apr. 23, 1889 |
| 949,055 | Beskow | Feb. 15, 1910 |
| 1,526,704 | Hird | Feb. 17, 1925 |
| 2,292,952 | MacDonald | Aug. 11, 1942 |
| 2,434,718 | Recker | Jan. 20, 1948 |
| 2,463,643 | Recker | Mar. 8, 1949 |
| 2,555,558 | Peterson | June 5, 1951 |
| 2,563,158 | Claffey | Aug. 7, 1951 |
| 2,600,008 | Ludeking | June 10, 1952 |
| 2,601,618 | Kringle | June 24, 1952 |

FOREIGN PATENTS

| Number | Country | Date |
|---|---|---|
| 713,058 | France | Aug. 10, 1931 |